(12) United States Patent
Nelsen et al.

(10) Patent No.: US 6,241,174 B1
(45) Date of Patent: Jun. 5, 2001

(54) BELT SHORTENING DEVICE

(75) Inventors: Daniel J. Nelsen, Providence; Aidan Petrie, Jamestown, both of RI (US)

(73) Assignee: Constance F. Berger, Naples, FL (US)

( * ) Notice: Subject to any disclaimer, the term of this patent is extended or adjusted under 35 U.S.C. 154(b) by 0 days.

(21) Appl. No.: 09/438,568

(22) Filed: Nov. 10, 1999

(51) Int. Cl.[7] .................................................. B65H 75/38
(52) U.S. Cl. ..................................... 242/388.3; 24/68 SB; 297/468
(58) Field of Search ............................. 242/388.3, 388.1, 242/388.2, 388.5, 388; 254/223, 225; 410/100, 103; 24/269, 71.1, 68 CD, 68 R, 68 SB, 129 A; 297/468

(56) References Cited

U.S. PATENT DOCUMENTS

| | | |
|---|---|---|
| 169,770 | 11/1875 | Burnham . |
| 1,606,221 | 11/1926 | Hergesheimer . |
| 1,620,363 | 3/1927 | Larkin . |
| 2,526,216 | 10/1950 | Gartner . |
| 3,430,303 * | 3/1969 | Perrin et al. ............................ 24/269 |
| 3,574,342 | 4/1971 | Berns . |
| 3,826,473 | 7/1974 | Huber . |
| 4,416,429 * | 11/1983 | Jessamine ......................... 242/388.1 |
| 4,510,652 | 4/1985 | van Iperen . |
| 4,604,773 | 8/1986 | Weber et al. . |
| 4,823,443 | 4/1989 | Waters . |
| 4,922,582 | 5/1990 | Flanigan . |
| 5,103,536 | 4/1992 | Kamper . |
| 5,402,958 * | 4/1995 | Mahaney ............................ 242/388.1 |
| 5,426,827 | 6/1995 | Tracy et al. . |
| 5,630,456 * | 5/1997 | Hugo et al. ............................ 242/388 |
| 5,695,147 * | 12/1997 | Zimmerman ...................... 242/388.3 |
| 5,839,789 | 11/1998 | Koledin ................................. 297/476 |
| 5,845,372 | 12/1998 | Smith et al. ............................. 24/168 |
| 6,105,211 * | 8/2000 | Berger ................................ 24/68 SB |

* cited by examiner

Primary Examiner—John M. Jillions
(74) Attorney, Agent, or Firm—Barlow, Josephs & Holmes, Ltd.

(57) ABSTRACT

A belt shortening device intended for use with a vehicle seat belt securing a baby seat is constructed and arranged so that it can be easily mounted to the existing seat belt without detaching the belt from its existing connection. The belt shortening device includes a tubular housing, a spindle rotatably received within the housing, and a ratchet mechanism operable for controlling rotation of the spindle. The housing has an open end and a closed end and includes a pair of longitudinal slits extending inwardly from the open end. The slits are symmetrically arranged in opposed relation so as to define a transverse slot in the housing for receiving the belt therein. A ratchet pawl is mounted in the side wall of the housing adjacent the open end thereof. The spindle has a body portion and two spaced arms extending perpendicularly outwardly from the body portion. The spaced arms define a longitudinal slot for transversely receiving the belt therein. The peripheral edge of the body portion includes a plurality of ratchet teeth. In use, the spindle is received in assembled relation with the housing and the belt such that the belt is transversely received within the slits of said housing and between the arms of the spindle, and further such that the body portion of the spindle is seated within the open end of the housing with the ratchet teeth slidably engaged with the pawl. The spindle is rotatable relative to housing to wind the belt within the housing.

6 Claims, 6 Drawing Sheets

BELT SHORTENING DEVICE

BACKGROUND AND SUMMARY OF THE INVENTION

The present invention relates generally to a device that is used to take up slack, or shorten, a length of belt webbing. More specifically, the present invention relates to devices suitable for taking up slack, or shortening, a seat belt webbing in a vehicle. The device is particularly suitable for the removal of slack from a seat belt webbing used to retain a baby seat in place on a supporting vehicle seat.

In the prior art, lengths of belt material or webbing are commonly used to retain a structure in place. For example, belts are frequently used to retain stacked articles in place on a pallet. Belts are also provided on the seats of vehicles to secure a seated occupant in place for safety purposes. In connection with the present invention, existing seat belts in vehicles are often used to secure a baby seat to the supporting vehicle seat. Typically, the seat belt is passed through an opening in the baby seat and secured with the end buckle in a normal manner. When securing a baby seat in a vehicle, especially for use with a small infant, it is critical that the baby seat be securely and snugly positioned on the seat, and it is further critical that the back support of the seat be oriented at desired angle. Proper positioning of the seat will more effectively distribute the baby's weight, and better support an infant's neck in an impact. While the existing seat belt is effective for retaining an adult passenger in place on the seat, when the belt is used with a baby seat, it often has unwanted slack which decreases the effectiveness of the belt's ability to secure and retain the baby seat in its proper position and orientation on the seat.

To address the inherent problem of slack in retaining belts, there have been many attempts in the prior art to reduce or eliminate such slack. For example, shortening devices including ratcheted spindles have been available in the prior art. The belt webbing is typically routed around the spindle and then wound about the spindle with the assistance of the ratchet. The ratchet provides leverage and locking to enable the belt to be tightened and released as desired. Also, spring clips have been provided to grip excess portions of the belt to thereby shorten the belt. However, these prior art devices suffer from many disadvantages which makes them undesirable to use. For example, the prior art shortening devices commonly require that a free end of the belt be routed through the shortening device to enable winding of the belt by the device to effectuate shortening. This is not particularly advantageous in a vehicle seat belt because a vehicle seat belt includes a large buckle on the end. To be routed through the interior of a shortening device, the device would have to have a rather large housing and would have to accommodate the large buckle and still be able to grasp the thin belt. Other devices permanently incorporate the ratchet take-up mechanism directly on the belt itself. Permanently mounted shortening devices such as these are commonly used on special belt systems for retaining articles on a pallet. As can be understood, a permanently mounted shortening device is not needed for vehicle owners who do not have small children or who have grown children. The provision of such devices as a standard vehicle option would be both costly and unnecessary.

In view of the foregoing, there is a demand for a compact, inexpensive and removable belt shortening device that is well suited for shortening vehicle seat belts. There is a particular demand for such a belt shortening device that can be easily fitted to an existing seat belt webbing without disengaging the existing belt connection.

In this regard, the present invention preserves the advantages of prior art belt shortening devices while, in addition, overcoming many disadvantages of such currently available devices and providing the necessary features not found in currently available devices. As indicated above, the belt shortening device of the present invention is intended for use with a vehicle seat belt that is used to secure a baby seat within a vehicle. The present belt shortening device is particularly constructed and arranged so that it can be easily mounted to an existing vehicle seat belt without detaching the belt from its existing connection. More specifically, the belt shortening device includes a cylindrical tubular housing, a spindle rotatably received within the housing, and a ratchet mechanism operable for controlling rotation of the spindle and winding of the belt around the spindle. The tubular housing has an open end and a closed end and includes a pair of longitudinal slits extending inwardly from the open end thereof. The slits are symmetrically arranged in opposed relation so as to define a transverse slot in the housing for receiving the belt therein. Symmetrically opposed ratchet pawls are mounted in the side wall of the housing adjacent the open end thereof. The pawls are pivotably mounted and are pivotably movable between a locking position and a release position. The spindle has a body portion and two spaced arms extending perpendicularly outwardly from the body portion. The peripheral edge of the body portion includes a plurality of ratchet teeth that engage with the ratchet pawls when the spindle is assembled with the housing. The spaced arms of the spindle define a longitudinal slot for transversely receiving the belt therein.

In use, the seat belt is slid into the slits in the housing so that the belt runs transversely through the housing. The spindle is received in assembled relation with the housing and the belt such that the belt is transversely received between the arms of the spindle, and further such that the body portion of the spindle is positioned within the open end of the housing with the ratchet teeth slidably engaged with the pawls. When assembled, the spindle is rotatable relative to housing to wind the belt around the spindle within the housing. The ratchet pawls hold the spindle in place to prevent loosening of the belt. Friction between the surfaces of the belt, the spindle and the belt maintain the housing and spindle in assembled relation. When it is desired to release the belt shortening device, the pawls are moved to the release position and the spindle is released to loosen the belt. Once released, the spindle can be removed from the housing to fully release the belt.

Accordingly, it is an object of the present invention to provide a belt shortening device that can remove unwanted slack in a vehicle seat belt that it used to secure a baby seat in a vehicle.

It is another object of the present invention to provide a belt shortening device that can be easily fitted to an existing seat belt webbing without disengaging the existing belt connection.

It is still another object of the invention to provide a belt shortening device that is easily mounted over the side edge of the belt.

It is yet another object of the invention to provide a belt shortening device comprised of two interlocking units that are received in assembled relation over the opposing side edges of the belt.

It is still another object to provide a belt shortening device that does not require any additional webbing or additional buckles.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
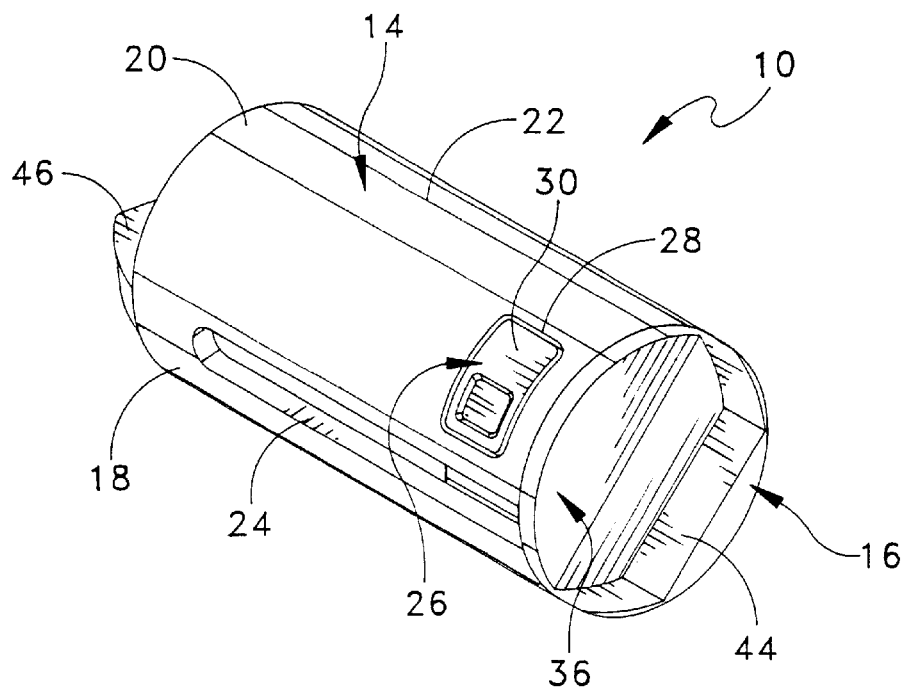
FIG. 1 is a perspective view of a belt shortening device constructed in accordance with the teachings of the present invention.
Figure 2:
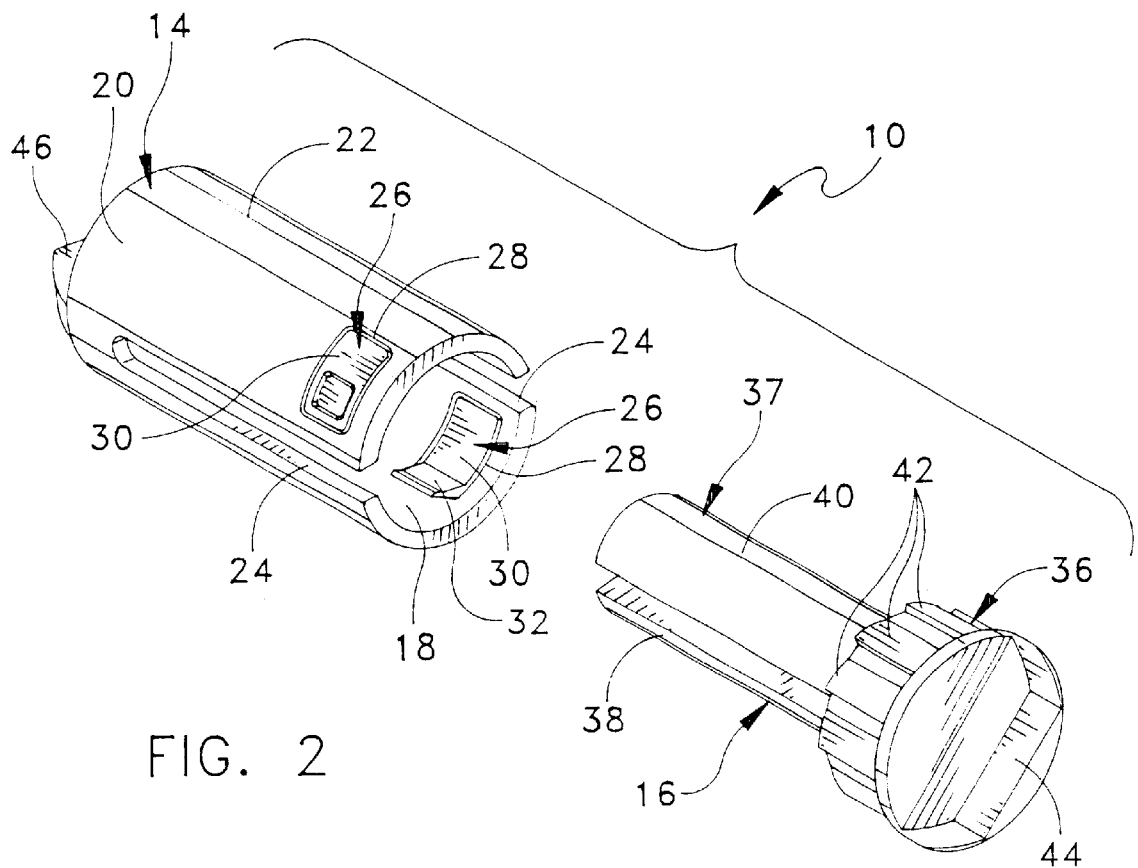
FIG. 2 is an exploded perspective view thereof.

Referring now to the drawings, the belt shortening device of the instant invention is illustrated and generally indicated at 10 in FIGS. 1–8. As will hereinafter be more fully described, the belt shortening device 10 is particularly useful for taking up slack in a seat belt 12 used to secure a baby seat 13 on the seat of a vehicle seat. The device 10 is specifically constructed and arranged so that it can be easily mounted to an existing vehicle seat belt 12 without detaching the belt 12 from its existing connections. Unless otherwise indicated herein, it is to be understood that the individual component parts of the device are preferably molded from suitable rigid plastic material. Alternatively, the components could be machined or cast from metal materials.

The belt shortening device 10 includes a cylindrical tubular housing generally indicated at 14, a spindle generally indicated at 16 rotatably received within the housing 14, and a ratchet mechanism that is operable for controlling rotation of the spindle 16 and winding of the belt 12 around the spindle 16.

The tubular housing 14 has an open end 18, a closed end 20 and a continuous side wall 22 extending therebetween. In the preferred embodiment, the housing 14 is cylindrical in shape. However, it should be understood that the housing 14 could be constructed in other configurations. The housing 14 includes a pair of longitudinal slits 24 extending inwardly from the open end 18 thereof. These slits 24 are symmetrically arranged in opposed relation so as to define a transverse slot in the housing 14 for receiving the belt 12 therein (See FIGS. 3 and 4 for insertion of belt 12 in slits 24).

Figure 5:
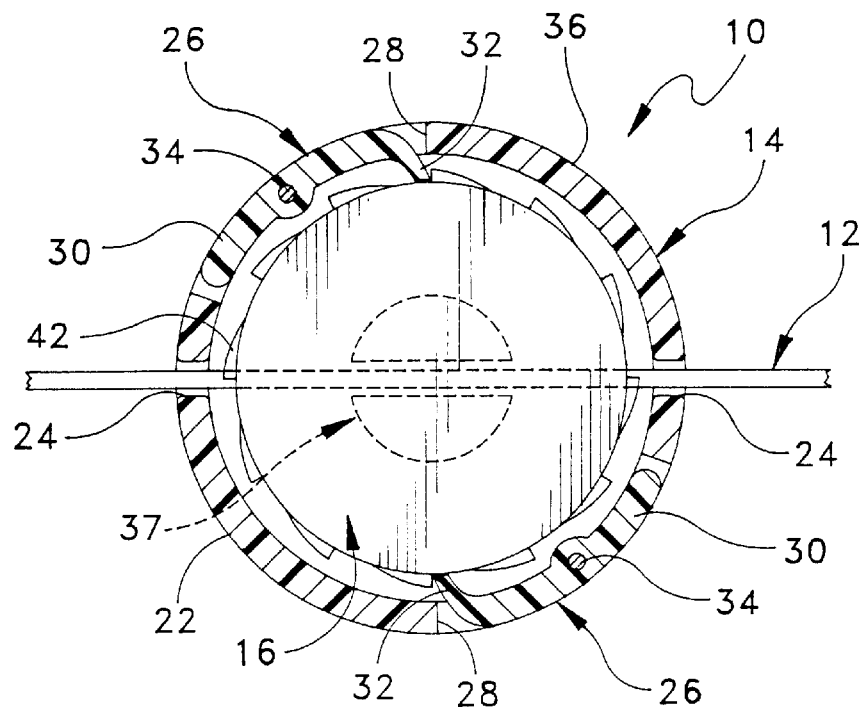
FIG. 5 is a cross-sectional view thereof as taken along line 5—5 of FIG. 4.
Figure 6:
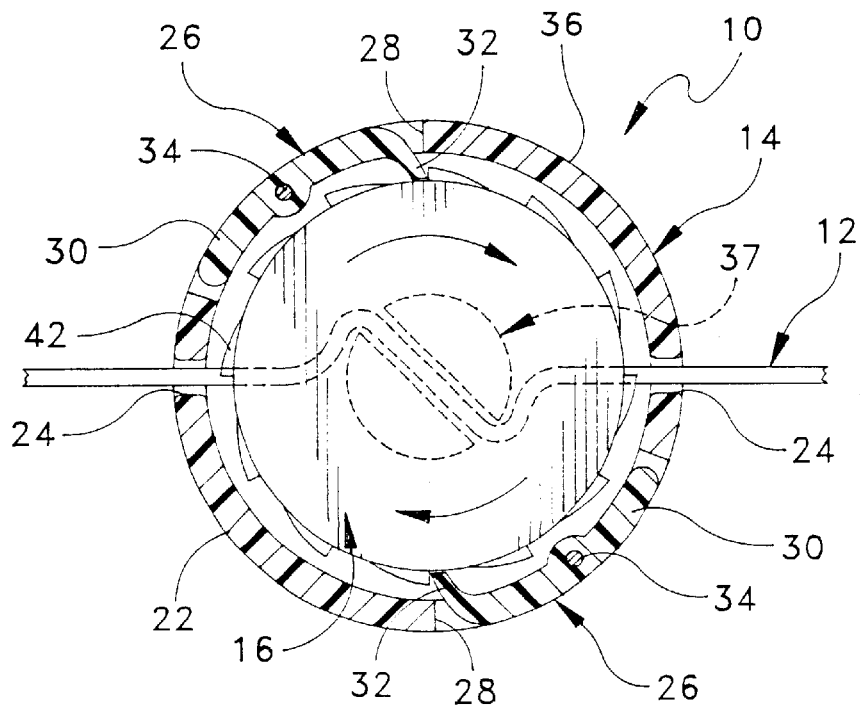
FIG. 6 is another cross-sectional view thereof showing partial rotation of the spindle.
Figure 7:
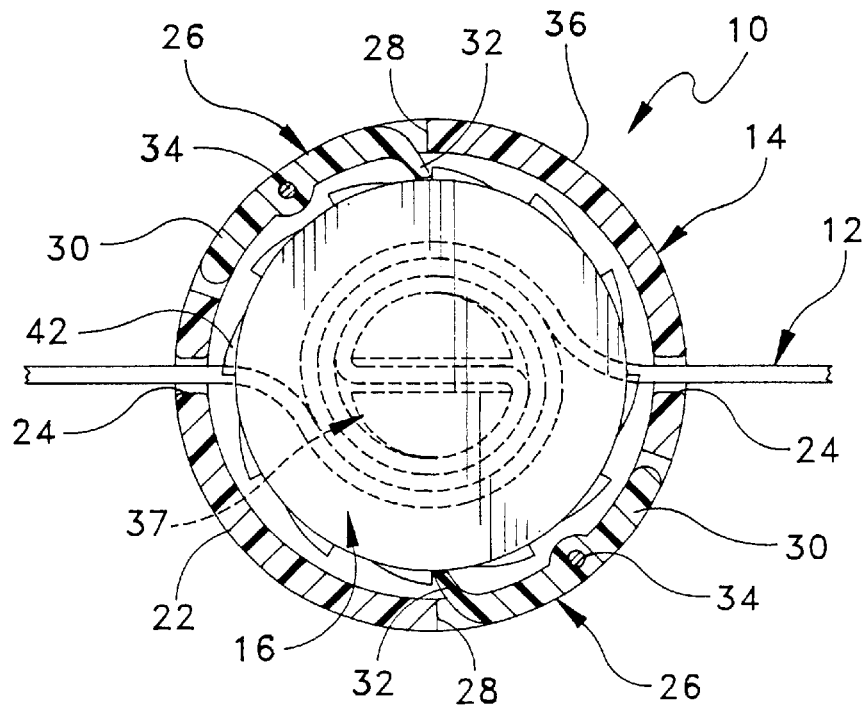
FIG. 7 is yet another cross-sectional view thereof showing several rotations of the spindle and winding of the belt around the spindle.
Figure 7A:
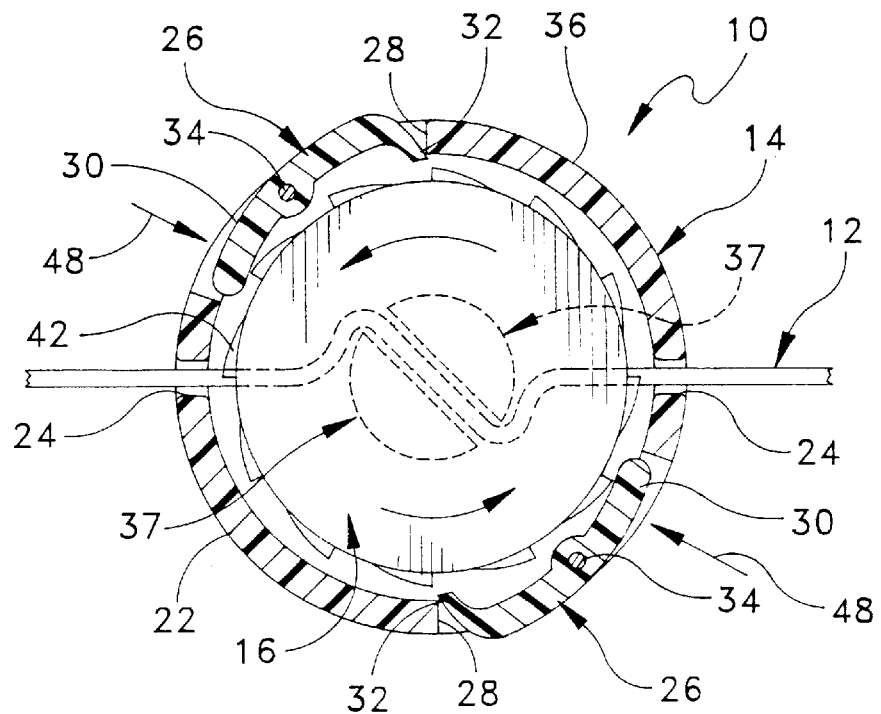
FIG. 7A is still another cross-sectional view thereof showing release of the ratchet pawls and unwinding of the belt from the spindle.
Figure 8:
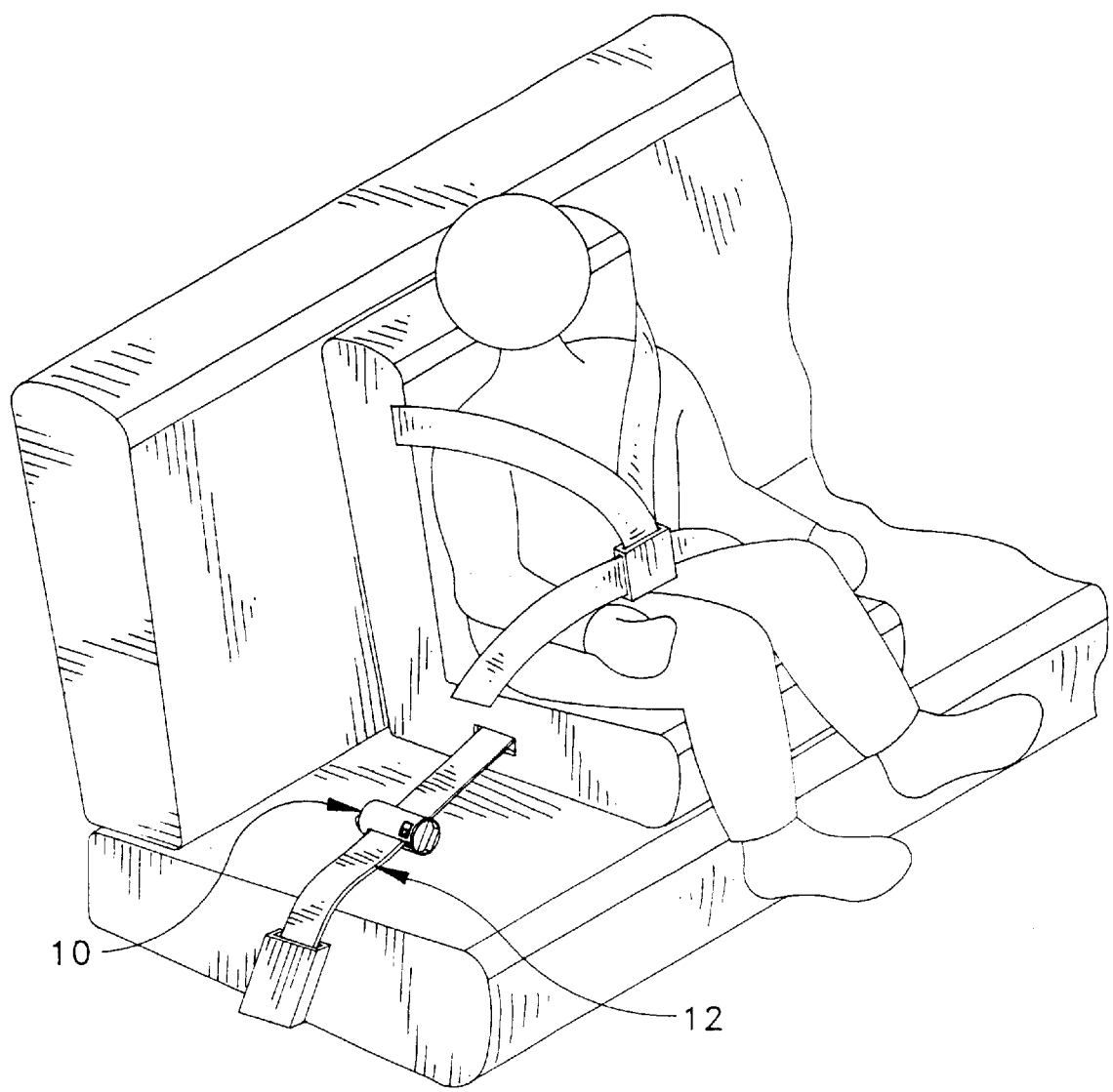
FIG. 8 is a perspective view of a baby seat as mounted on a vehicle seat and the belt shortening device mounted on the webbing of the seat belt.

The housing 14 still further includes a pair of symmetrically opposed ratchet pawls generally indicated at 26 pivotably mounted in openings 28 formed in the side wall 22 of the housing 14 adjacent the open end 18 thereof. More specifically, each of the pawls 26 comprises an arcuate body portion 30 having a pawl tooth 32 extending inwardly into the interior of the housing 14 from the inner side of one end thereof. The center of the body portion 30 is pivotably mounted on a pivot shaft 34 that extends transversely across the openings 28 in the housing 14. In this regard, the pawls 26 are pivotably movable between a locking position as illustrated in FIGS. 5–7, and a release position as illustrated in FIG. 7A.

The spindle 16 has a main body portion generally indicated at 36 and a spindle arm generally indicated at 37 comprising two spaced arms 38, 40 extending perpendicularly inwardly from the inner side surface of the body portion 36. Keeping with the preferred cylindrical shape of the housing 14, the main body portion 36 is also preferably cylindrical in shape having a circular peripheral edge. When assembled with the housing 14, the main body portion 36 will be seated within the open end 18 of the housing 14 and should have a diameter that allows seating of the body portion 36 within the interior of the side walls 22 of the housing 14. The peripheral edge of the body portion 36 includes a plurality of ratchet teeth 42 that engage with the pawl teeth 32 of the ratchet pawls 26 when the spindle 16 is assembled with the housing 14. The spaced arms 38, 40 of the spindle 16 define a longitudinal slot for transversely receiving the belt 12 therein. The outer side surface of the body portion 36 includes an element 44 for grasping and rotating the spindle 16. As illustrated in the preferred embodiment, the grasping element 44 comprises a raised shoulder extending along a diametrical centerline of the body portion 36.

Figure 3:
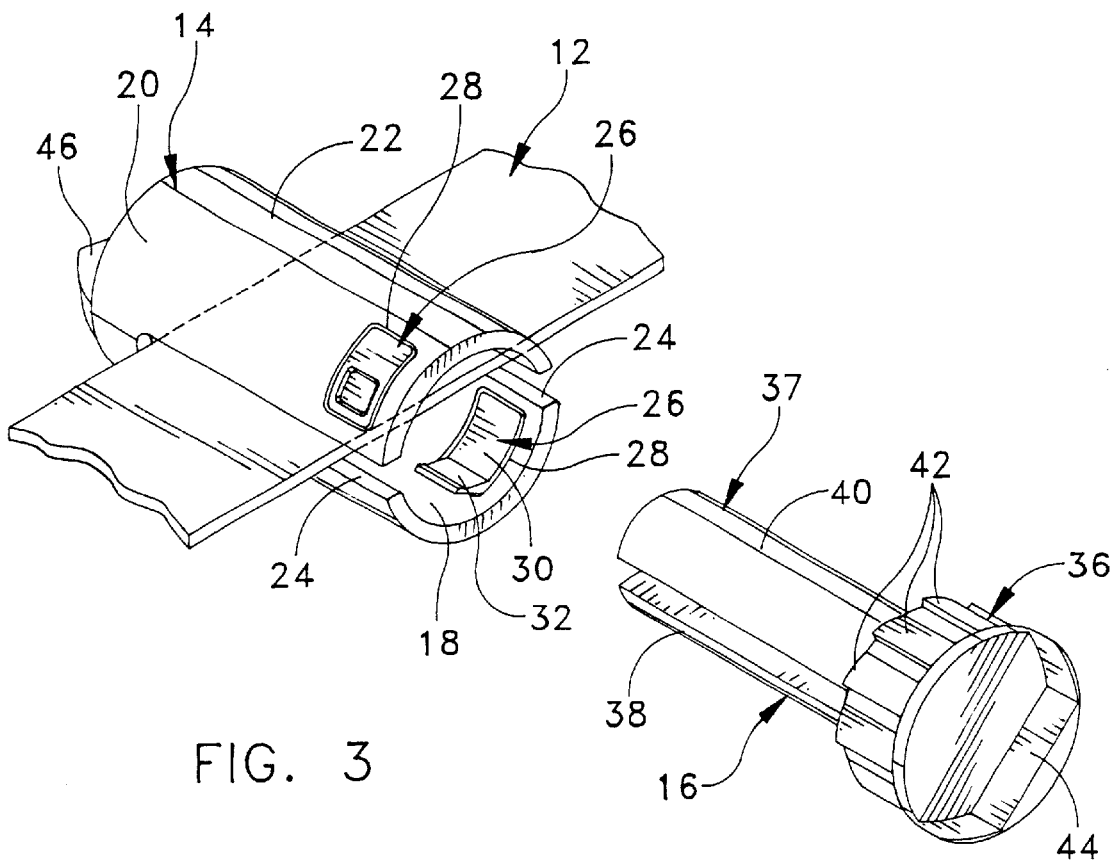
FIG. 3 is an assembly view thereof showing the positioning of a belt webbing within the housing.
Figure 4:
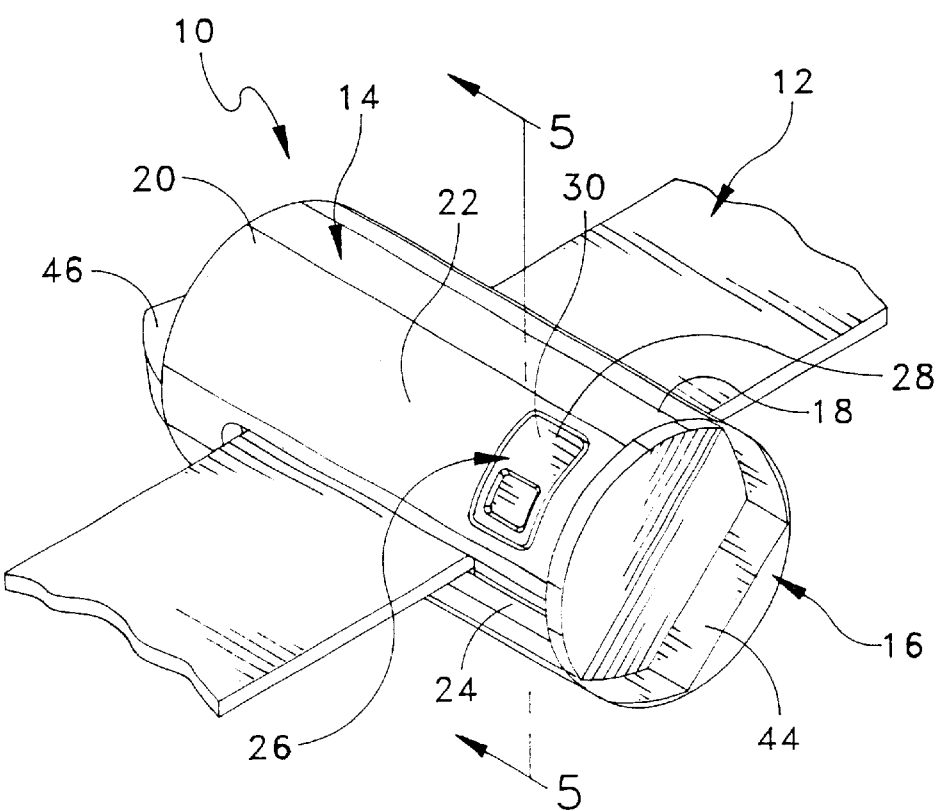
FIG. 4 is another assembly view showing assembly of the spindle with the housing.

In use of the device, the side edge of the seat belt 12 is slid into the slits 24 in the housing 14 so that the belt 12 runs transversely through the housing 14 (See FIG. 3). The spindle 16 is then received in assembled relation with the housing 14 and the belt 12 such that the belt 12 is transversely captured between the arms 38, 40 of the spindle 16, and further such that the body portion 36 of the spindle 16 is positioned within the open end 18 of the housing 14 with the ratchet teeth 42 slidably engaged with the pawl teeth 32. Once assembled, the spindle 16 is rotatable relative to housing 14 to wind the belt 12 around the spindle 16 within the housing 14 (See FIGS. 6 and 7). Rotation of the spindle 16 is accomplished by grasping the raised shoulder 44 on the main body portion 36, and further by grasping a second raised shoulder 46 formed on the outside of the closed end 20 of the housing 14. Gasping both the housing 14 and the spindle 16 will facilitate the relative rotation of the two components. The ratchet pawls 26 hold the spindle 16 in a fixed rotational position to prevent loosening of the belt 12. Friction between the surfaces of the belt 12, the housing 14, and the spindle 16 maintain the housing 14 and spindle 16 in assembled relation. When it is desired to release the belt shortening device 10, the pawls 26 are moved to the release position (See FIG. 7A) by pressing the ends of the pawls 26 inwardly (arrows 48 in FIG. 7A) whereby the spindle 16 is released to allow rotation of the spindle 16 in the opposite direction to loosen the belt 12. Once released, the spindle 16 can be removed from the housing 14 to fully release the belt 12.

Figure 9:
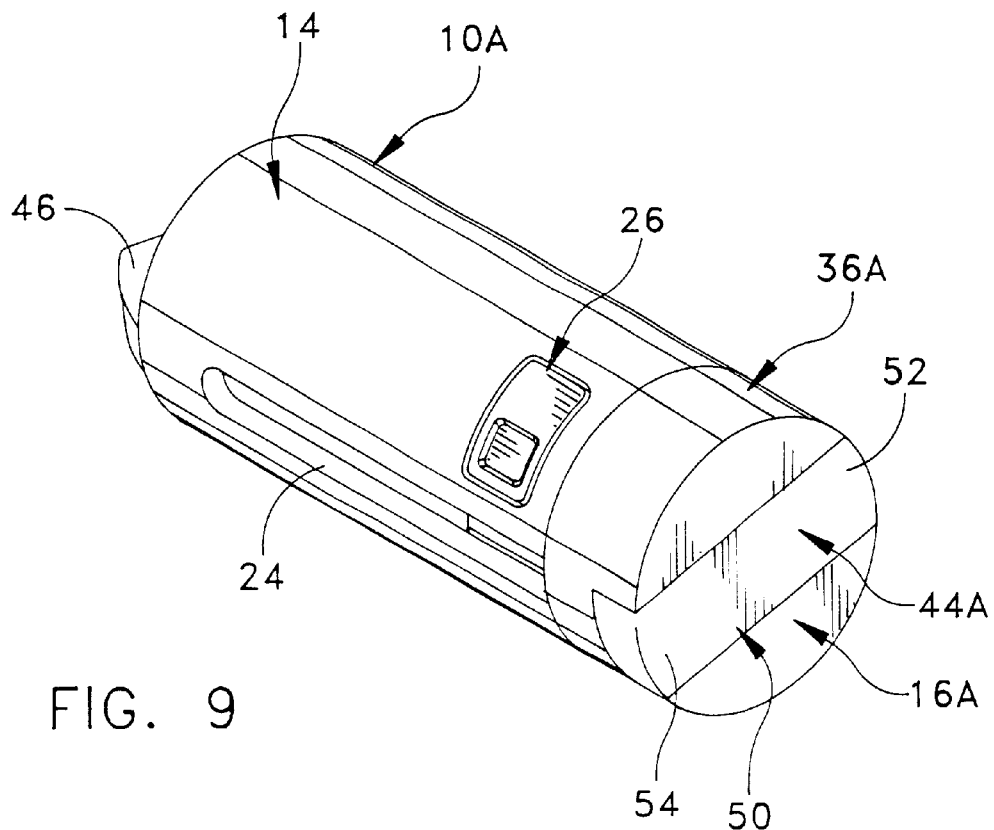
FIGS. 9 and 10 are perspective views of an alternative embodiment of the belt shortening device.
Figure 10:
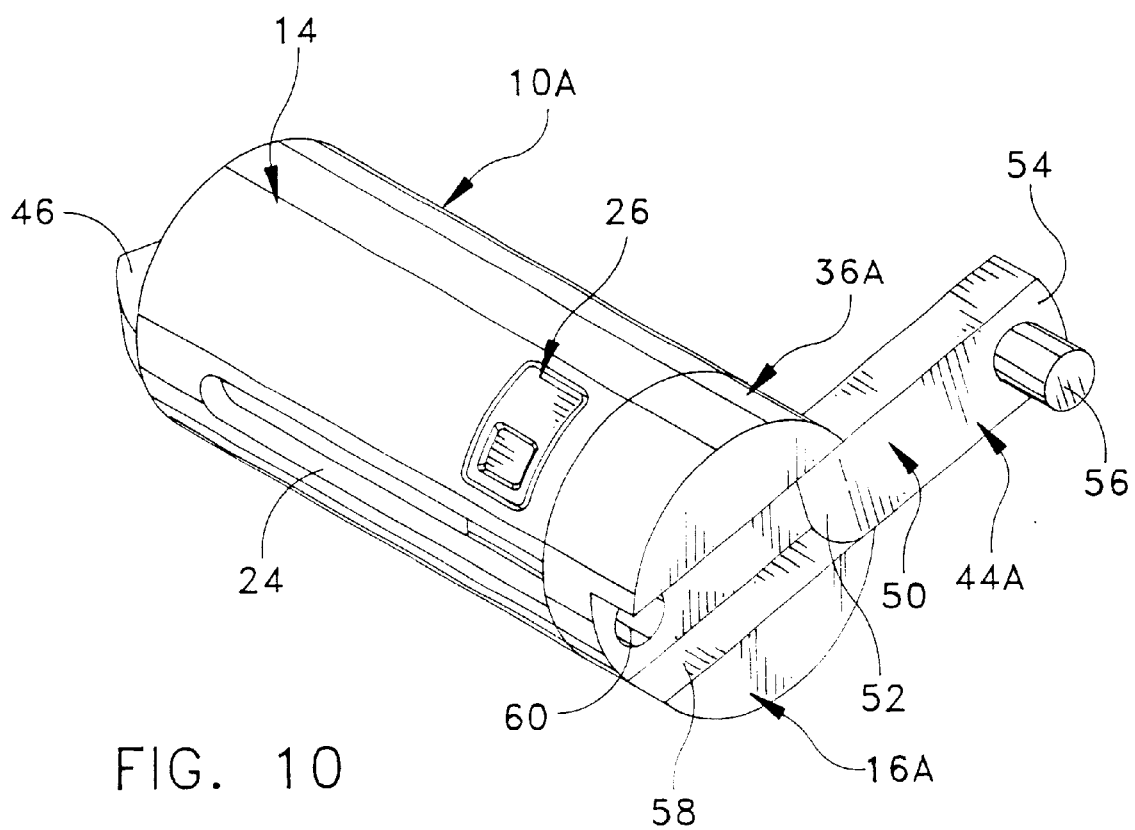

Turning to FIGS. 9 and 10, an alternative embodiment of the belt shortening device is illustrated and generally indicated at 10A. The alternative embodiment 10A is identical to the preferred embodiment with the single exception having a different grasping element generally indicated at 44A for rotation of the spindle 16A. In the alternative embodiment, the grasping element 44A comprises a lever arm 50 that is attached to the body portion 36A of the spindle 16A. The lever arm 50 includes a first end 52 that is pivotably attached to the outside surface of the body portion 36A, and a second handle end 54. The first end 52 can be pivotably attached by a pivot pin (not shown) or other suitable pivot connection. The second end 54 includes a post 56 to facilitate grasping of the element 44A. In use, the lever arm 50 is normally found in a storage position (FIG. 9) wherein the lever arm 50 is seated within a recessed channel 58 in the outside surface of the body portion 36A. The post 56 is seated within a bore 60 formed within the channel 58. In this regard, it is pointed out that the body portion 36A of the spindle 16A is somewhat thicker than in the preferred embodiment to accommodate recessed mounting of the lever arm 50. The lever arm 50 is movable to an active position (FIG. 10) wherein the handle end 54 is pivoted 180 degrees and is presented for leveraged rotation of the spindle 16A using the extended length of the lever arm 50 as a moment arm.

It can therefore be seen that the instant invention provides a unique and improved belt shortening device that can remove unwanted slack in a vehicle seat belt that it used to secure a baby seat in a vehicle. The use of two discrete interlocking units received over the opposing side edges of the belt provides a device that can be easily fitted to an existing seat belt webbing without disengaging the existing belt connection. The simple design and use of proven ratchet mechanisms further provide for an inexpensive and compact device. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A belt shortening device comprising:
    a tubular housing having open and closed ends and a continuous side wall extending between said open and closed ends, said side wall including a pair of longitudinally extending slits symmetrically arranged in opposed relation along a transverse centerline of said housing, said slits extending inwardly from said open end so as to define a transverse slot in said housing for receiving a belt therein;
    a ratchet pawl movably mounted in the side wall of the housing adjacent said open end thereof; and
    a spindle having a body portion and two spaced arms extending perpendicularly outwardly from an inner side of said body portion, said spaced arms defining a slot for transversely receiving a belt therein, an outer side of said body portion including a grasping formation adapted to facilitate rotation of said spindle relative to said housing, said body portion having a peripheral edge, said peripheral edge including a plurality of ratchet teeth,
    said spindle being removably received in assembled relation with said housing and said belt such that a central portion of said belt is transversely received between said arms of said spindle and within said slits of said housing and further such that said body portion of said spindle is positioned within the open end of said housing with said ratchet teeth slidably engaged with said pawl to provide rotational control of said spindle, said spindle being rotatable relative to housing to wind said belt around said spindle, said pawl being movable between a locking position and a release position.

2. The belt shortening device of claim 1 wherein said closed end of said housing includes a grasping formation.

3. The belt shortening device of claim 1 wherein said grasping formation comprises a raised shoulder.

4. The belt shortening device of claim 1 wherein said grasping formation comprises a lever arm having a first end pivotably connected to said body portion of said spindle.

5. The belt shortening device of claim 4 wherein said body portion of said spindle includes a recessed channel on said outer side, said lever arm being pivotably movable between a storage position wherein said lever arm is positioned within said recessed channel and an active position wherein said lever arm is pivoted outwardly from said recessed channel.

6. The belt shortening device of claim 1 further comprising a second ratchet pawl movably mounted in said side wall in symmetrically opposed relation to said other ratchet pawl.

\* \* \* \* \*